United States Patent
Nascimbene et al.

(10) Patent No.: US 7,729,330 B2
(45) Date of Patent: Jun. 1, 2010

(54) SCHEDULER AND METHOD OF SCHEDULING DATA FOR COMMUNICATION BETWEEN A NODE STATION AND PLURALITY OF RADIO TERMINALS

(75) Inventors: Andrea Nascimbene, Torre d'Isola (IT); Massimiliano Buscato, Motta Visconti (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 456 days.

(21) Appl. No.: 10/558,200

(22) PCT Filed: May 27, 2003

(86) PCT No.: PCT/EP03/05576

§ 371 (c)(1),
(2), (4) Date: Jan. 22, 2007

(87) PCT Pub. No.: WO2004/107605

PCT Pub. Date: Dec. 9, 2004

(65) Prior Publication Data

US 2007/0133498 A1 Jun. 14, 2007

(51) Int. Cl.
*H04J 3/00* (2006.01)
(52) U.S. Cl. .................... 370/345; 370/508; 370/31
(58) Field of Classification Search ............ 370/203, 370/344, 345, 436, 336, 347, 337, 508, 31; 455/77, 91
See application file for complete search history.

(56) References Cited

U.S. PATENT DOCUMENTS

| | | | | |
|---|---|---|---|---|
| 5,274,626 | A * | 12/1993 | Hotta et al. | 370/296 |
| 5,970,056 | A | 10/1999 | Crisler et al. | |
| 6,469,996 | B1 * | 10/2002 | Dupuy | 370/337 |
| 6,741,614 | B1 * | 5/2004 | Porter et al. | 370/508 |
| 2002/0102948 | A1 * | 8/2002 | Stanwood et al. | 455/91 |
| 2002/0118666 | A1 * | 8/2002 | Stanwood et al. | 370/345 |
| 2002/0173277 | A1 * | 11/2002 | Takao et al. | 455/77 |
| 2003/0128658 | A1 * | 7/2003 | Walton et al. | 370/208 |
| 2004/0081131 | A1 * | 4/2004 | Walton et al. | 370/344 |
| 2005/0174971 | A1 * | 8/2005 | Lenzini et al. | 370/336 |

FOREIGN PATENT DOCUMENTS

EP 1 179 898 2/2002

OTHER PUBLICATIONS

International Search Report for PCT/EP03/05576 dated Jan. 21, 2004.

* cited by examiner

*Primary Examiner*—Kwang B Yao
*Assistant Examiner*—Syed Bokhari
(74) *Attorney, Agent, or Firm*—Nixon & Vanderhye P.C.

(57) ABSTRACT

A method is provided for scheduling downlink and uplink data bursts in a frame for communication between a node station and a plurality of access terminals including half-duplex terminals, comprising the steps of allocating, in a current frame having a downlink and an uplink portion, a Tx burst in the uplink portion of the frame for each access terminal, the Tx burst of each access terminal starting at a time in the uplink portion which is greater than or equal to the start time in the downlink portion of corresponding Rx data incremented by the duration of said Rx data.

5 Claims, 7 Drawing Sheets

SCHEDULER AND METHOD OF SCHEDULING DATA FOR COMMUNICATION BETWEEN A NODE STATION AND PLURALITY OF RADIO TERMINALS

This application is the US national phase of international application PCT/EP2003/005576 filed 27 May 2003, which designated the U.S., the entire content of which is hereby incorporated by reference.

TECHNICAL FIELD

The technology relates to a time division multiplexing (TDM) frame based media access control (MAC) scheduling architecture for half-duplex terminals operating on point-to-multipoint (PMP) systems.

BACKGROUND

In recent years, the fast growing of datacom networks and the large and ever-increasing amount of services made available to the users over such networks have led to a remarkable growth of traffic which is heavily affecting network performance. Terrestrial broadband wireless access (BWA), point-to-multipoint (PMP) systems with dynamic capacity allocation are thus expected to support and provide an increasing number of applications and services, including the highly demanding multimedia and last generation mobile network infrastructure. The former ones include, for instance, fast Internet video and video on demand (VoD), the latter ones include the 2G/3G mobile network infrastructure, particularly as concerns connection among mobile base stations and switch sites.

In a typical system, a PMP system topology scheme comprises a plurality of base stations connecting several access terminals through a particular media and by using a particular multiple access scheme.

For illustrative purposes and clarity reasons only, the topology scheme is described for a single base station. The base station is preferably a radio node station (RNS), i.e. a site interfacing one or more radio access terminals through a radio connection. A radio node station comprises at least one radio unit with antenna and modem to make it possible for radio access terminals to access services provided by the network to which the radio Base Station is connected.

A radio access terminal (RAT) is a terminal device used to connect end users or mobile base stations to the network via a radio connection towards a radio node station.

An important issue is the cost of RATs, which mainly affects the cost per link. The cost of a radio node station, is spread over a large amount of RATs and, for this reasons, is of less significance.

In full-duplex (FDD) terminals, a first radio frequency band is used for downstream traffic from an RNS to the RAT and a second radio frequency band is used for upstream traffic from the RAT to the RNS. Moreover, a guard frequency band separates the upstream and downstream bands. This allows data transfer in both directions at the same time but, as a drawback, implies the use of expensive equipment, which may decrease the appeal of wireless systems and services. An approach which can be used in order to decrease costs is to employ the half duplex mechanism (H-FDD). In a half duplex system, different frequencies are still used, but the transmitter and the receiver of a RAT cannot operate at the same time. Half-duplex RATs are less complex and cheaper than their full-duplex counterparts, since specialised technical components, like diplexer filters, are no longer needed, and a single multi-chip module (MCM) can be used for both receiving and transmitting activities.

In BWA/PMP systems, as in most communication networks, information is transferred in frames. A frame is a block of data containing both actual data and ancillary information to synchronise transmission and to supply transmission data to the RATs. BWA/PMP frame structures can dynamically support both FDD and H-FDD terminals and use data structures based on two alternative solutions, namely slot based structures and frame based structures. However, H-FDD terminals have a considerable impact on the access system. In fact, as this kind of terminal cannot receive and transmit at the same time, performance may be affected.

A typical frame structure which is used to handle both full-duplex and half-duplex terminals is provided by the ETSI BRAN HIPERACCESS standard, which proposes a downlink frame based structure comprising a preamble, a downlink map, an uplink map, a first downlink portion based on TDM and a second downlink portion based on TDMA (time division multiple access). The size or duration of the sections is variable and the second portion is optional. Broadly speaking, the two maps at the beginning of the frame contain the so called broadcast channel, that is information regarding the downlink and uplink frame structures. It is to be noted that, as a convention, in a point to multipoint wireless broadband access system (PMP/WBA) the term "uplink" identifies the connection directed from the RATs to the RNS, while the term "downlink" identifies the connection directed from the RNS to the RATs.

The TDM frame is typically more efficient for handling full-duplex terminals while the TDMA portion provides a better handling of half-duplex terminals. The downlink TDMA mechanism is more complex to handle as it implies discontinuous reception at the RAT side, which means a more complex receiver implementation and higher costs for the RAT.

A downside of this approach is that it requires quite sophisticated circuitry on the radio access terminals.

SUMMARY

An aim of the technology described is to overcome the above mentioned problems by reducing the costs, particularly at the radio access terminal side, in a datacom system in which a radio node station communicates with several radio access terminals.

Within this aim, an object is to schedule Rx data in the downlink section of a frame so that no discontinuities are found in such section.

Another object is to provide a new method and system that fit on existing radio access terminals with no need to add or modify standard circuitry.

This aim, this object and others, which will become apparent hereinafter, are achieved by a method of scheduling downlink and uplink data bursts in a frame for communication between a node station and a plurality of access terminals including half-duplex terminals. In a current frame having a downlink and an uplink portion, a Tx burst in the uplink portion of the frame is allocated for each access terminal. The Tx burst of each access terminal starts at a time in the uplink portion, which is greater than or equal to the start time in the downlink portion of corresponding Rx data incremented by the duration of said Rx data.

This aim and these objects are also achieved by a scheduler running on a base station for scheduling downlink and uplink data bursts in a frame for communication between the node station and a plurality of access terminals including half-duplex terminals. The scheduler computes and allocates in a current frame in a current frame having a downlink and an uplink portion, a Tx burst in the uplink portion of the frame for each access terminal. The Tx burst of each access terminal starts at a time in the uplink portion which is greater than or equal to the start time in the downlink portion of corresponding Rx data incremented by the duration of said Rx data.

In a first case, all access terminals are half-duplex terminals, and the Tx burst of the last half-duplex access terminal is allocated in the uplink section of the following frame, at a time corresponding to the start time of the first Rx data. On the other hand, should the access terminals comprise both half-duplex and full-duplex terminals, then the last Tx burst in the downlink section preferably relates to a full-duplex terminal while the first Rx data in the downlink section relates to a half-duplex terminal, so that no need exists to postpone a Tx burst to the following frame.

Conveniently, the Tx burst of each full-duplex terminal is allocated in any available time interval in the uplink portion of the frame, i.e. any time interval which is not filled by data relating to half-duplex terminals, even falling at a time which precedes the corresponding Rx allocation time in the downlink section of the Rx data of the full-duplex terminal in issue.

Advantageously, all the Rx data of half-duplex terminal can be allocated before the Rx data of the full-duplex terminals. The Tx bursts of half-duplex terminal may be all allocated after the Rx data of the full-duplex terminals.

BRIEF DESCRIPTION OF THE DRAWINGS

Further characteristics and advantages will become apparent from the following detailed description, given by way of a non limitative example and illustrated in the accompanying figures, wherein.

DETAILED DESCRIPTION

Figure 1:
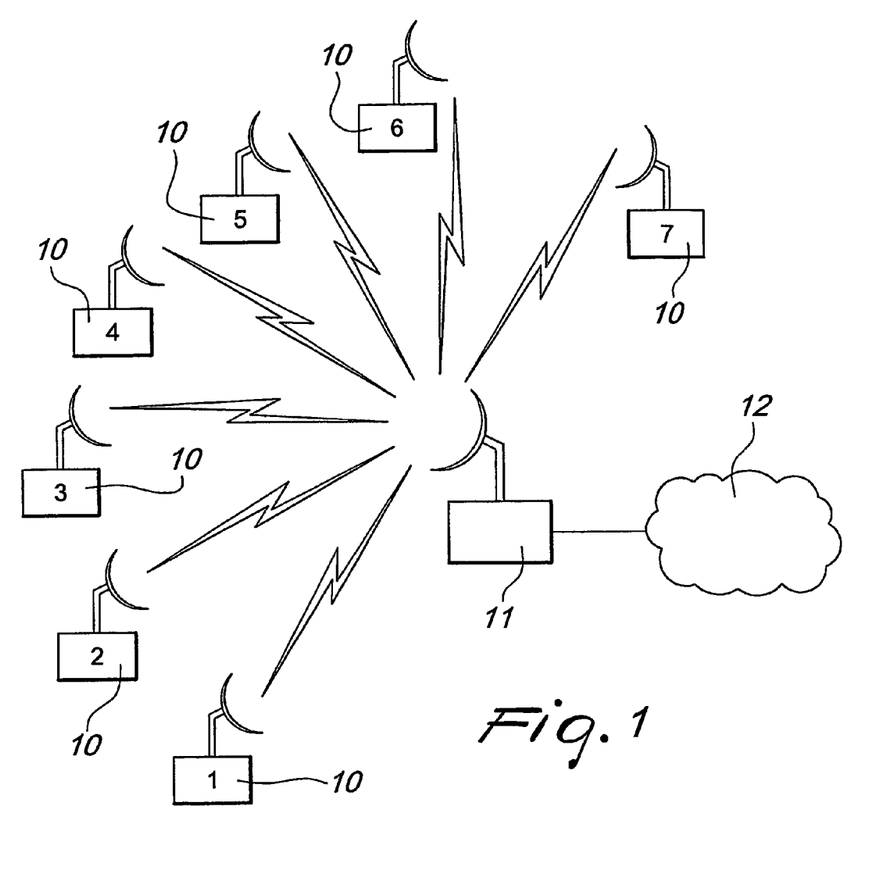
FIG. 1 is a schematic view showing an exemplary communications network comprising a radio node station and several radio access terminals.

FIG. 1 is a schematic view showing an exemplary communications network comprising a generic communications network 12, a radio node station 11 and a plurality of radio access terminals 10, labelled 1 to 7. The RATs can be either H-FDD or FDD terminals, and can both receive data from the RNS 11 and send data to the RNS through a wireless connection. The communication from the RNS 11 to a RAT 10 is hereby referred to as "downlink", while the communication from a RAT 10 to the RNS 11 is referred to as "uplink".

The RNS is provided with conventional hardware and/or software computation means for handling communication from and to the RATs 10 on one side and from and to the communications network 12 on the other side. More particularly, such computation means are programmed through conventional techniques according to the MAC scheduling algorithms disclosed below.

Figure 2:
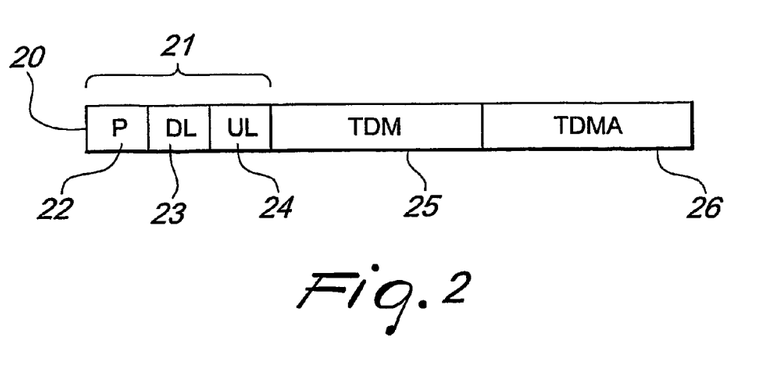
FIG. 2 is a block diagram showing the sections of a typical communications frame.

FIG. 2 shows the structure and the sections of a typical communications frame 20. The frame 20 comprises a preamble and broadcast section 21, a TDM downlink section 25 and a TDMA downlink section 26. The preamble and broadcast section 21 comprises in turn a first portion 22, labelled "P", storing conventional preamble data, for instance synchronisation data, a second portion 23, labelled "DL", storing a downlink map, and a third portion 24, labelled "UL" and storing and uplink map. The contents of section 21 follow conventional techniques and are therefore not described in detail.

The TDM downlink section 25 contains Time Division Multiplexing (TDM) data and stores portions of data addressed to the plurality of RATs 10. A portion of data to be received by a RAT is hereby referred to as "RAT Rx data". In the following description and in the drawings, an Rx data concerning RAT number i is identified by the expression Rx(RAT(I)).

The TDMA downlink section 26 contains Time Division Multiple Access (TDMA) data and stores further data sent to the plurality of RATs 10 by the RNS 20. Use of the TDMA portion of the frame is preferably avoided.

A portion of data sent by a RAT to the RNS is hereby referred to as a "RAT Tx burst". In the following description and in the drawings, a Tx burst concerning RAT number i is identified by the expression Tx(RAT(I)). Tx bursts are usually very small in size or duration, particularly they are usually much smaller than corresponding Rx data. For the sake of clarity, it is therefore assumed that the size of a Tx burst never exceeds the size of an Rx data. However, the skilled in the art will appreciate that the rare situations in which a Tx burst exceeds an Rx data are trivially handled through several techniques which are well known in the state of the art.

Figure 3:
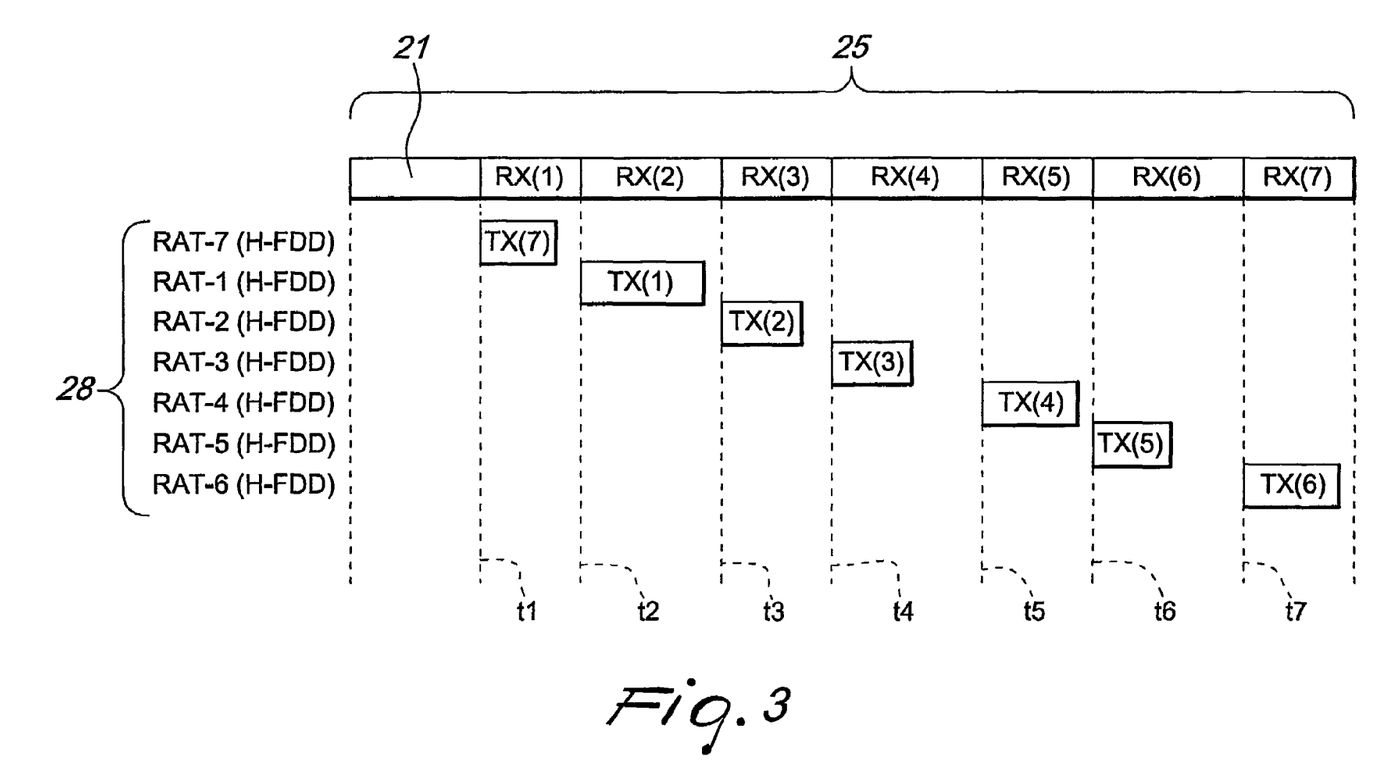
FIG. 3 is a block diagram showing information allocated in a frame including data relating to H-FDD RATs, according to a first example embodiment.

FIG. 3 further details the frame structure of an example. For the sake of clarity, the frame is represented in two dimensions, wherein the horizontal axis displays sections 21 and 25 while the uplink section 28 is split along the vertical axis. Labels identifying each of seven RATs 10 are also shown on the vertical axis. Finally labels t1-t7 indicate the point in the frame section 25 corresponding to a progressive time which marks the start of an Rx data. The difference between two times in a row is preferably, but not necessarily, a multiple of a time unit.

For clarity reasons, the term "frame" is hereby used to indicate both the information sent through the downlink channel, comprising data sent from the RNS to the RATs, and the information sent through the uplink channel at a corresponding time, from the RATs to the RNS. More in detail, a frame fr is considered at a logical level as comprising a TDM downlink portion 25 and a corresponding TDMA uplink portion 28. The downlink portion of each fr$^{th}$ frame contains preamble and Rx data which is broadcasted from the RNS to the RATs. On the other hand, the uplink portion of the same frame fr is a virtual representation of those Tx bursts which are sent from the RATs to the RNS and which can be gathered into a logical group in the same frame, as it will become clear in the following description.

Figure 4:
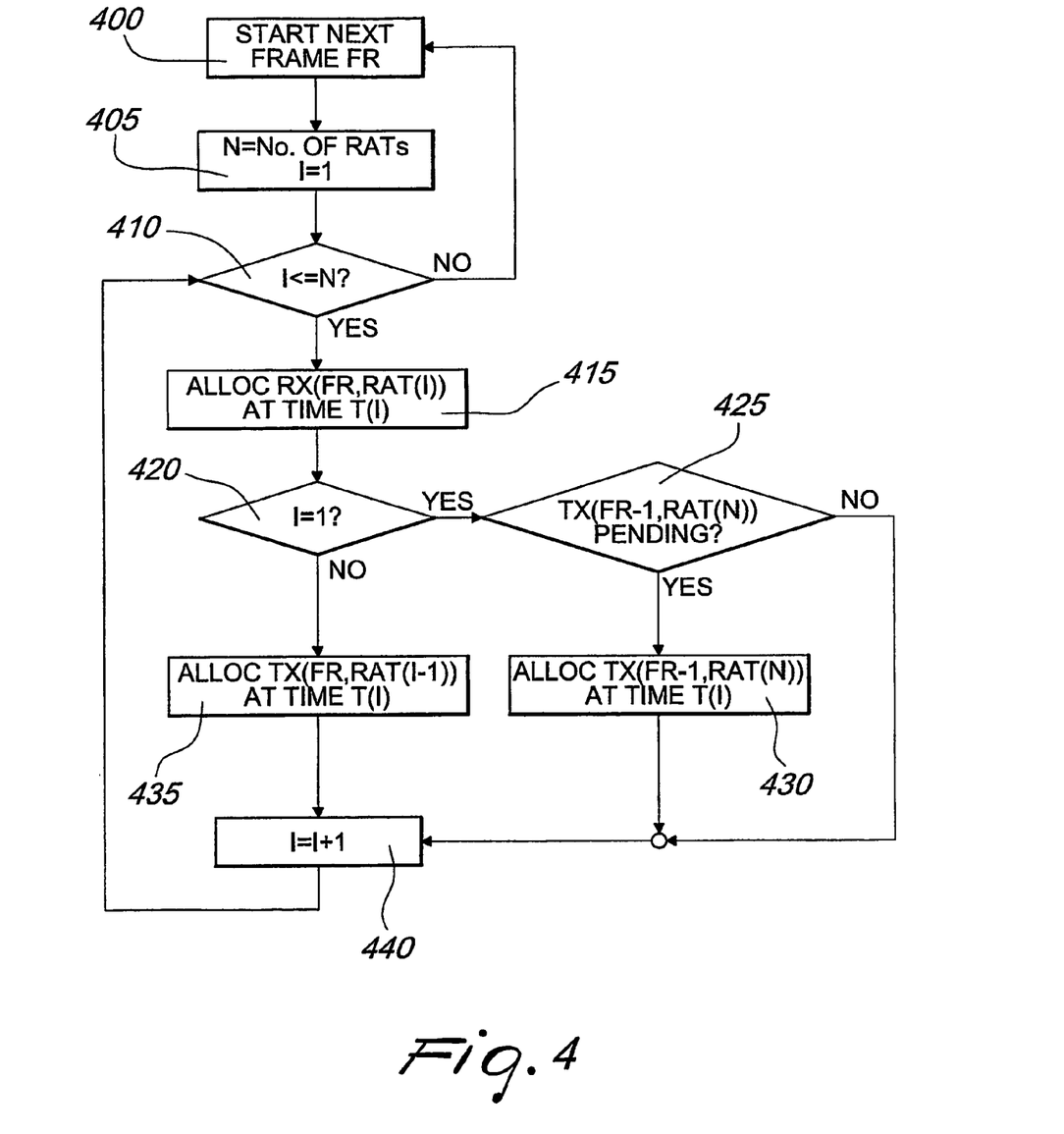
FIG. 4 is a flow diagram showing the steps of a method according to an example embodiment which generates the frame information of FIG. 3.

The operation of the method and of the system according to a first example embodiment is depicted in the data flow diagram 400 of FIG. 4, which refers to the frame structure of FIG. 3 and which explains the disclosed scheduling method with reference to a plurality of half-duplex radio terminals only.

At block 400 the scheduler is ready to start the allocation of a new frame 20. At block 405 the value N is set to the number of RATs that must be handled in the current frame, for instance seven RATs as shown in FIG. 3 and a counter I is set to value one. At step 410, it is checked whether the value of counter I is less or equal than the amount of RATs stored in variable N. If so, at step 415 the scheduler allocates burst Rx for the $I^{th}$ RAT in the downlink portion 25 of the current frame 21, starting at time T(I). At step 420 it is checked whether the RAT which is currently being handled is the first RAT in the list. If so, at step 425 it is checked whether a Tx burst of the last RAT in the list is still pending from the previous frame transmission. If so, at step 430 the scheduler allocates in the uplink portion 28 of the current frame the still pending Tx burst, at time T(1). If the RAT in issue is not the first RAT in the list, then a Tx burst relating to the preceding RAT, i.e. RAT(I−1) is allocated at time T(I) (step 435). The counter I is then increased by one unit and the loop is resumed at step 410 and repeated until all RATs have been handled. The scheduler is then ready to jump to the next frame.

The above described embodiment handles the case in which all RATs are of the half-duplex kind. However, it is likely that a mixture of half-duplex RATS (H_RATs) and full duplex RATs (F_RATs) is to be handled by the scheduler of radio node station 11.

Figure 5:
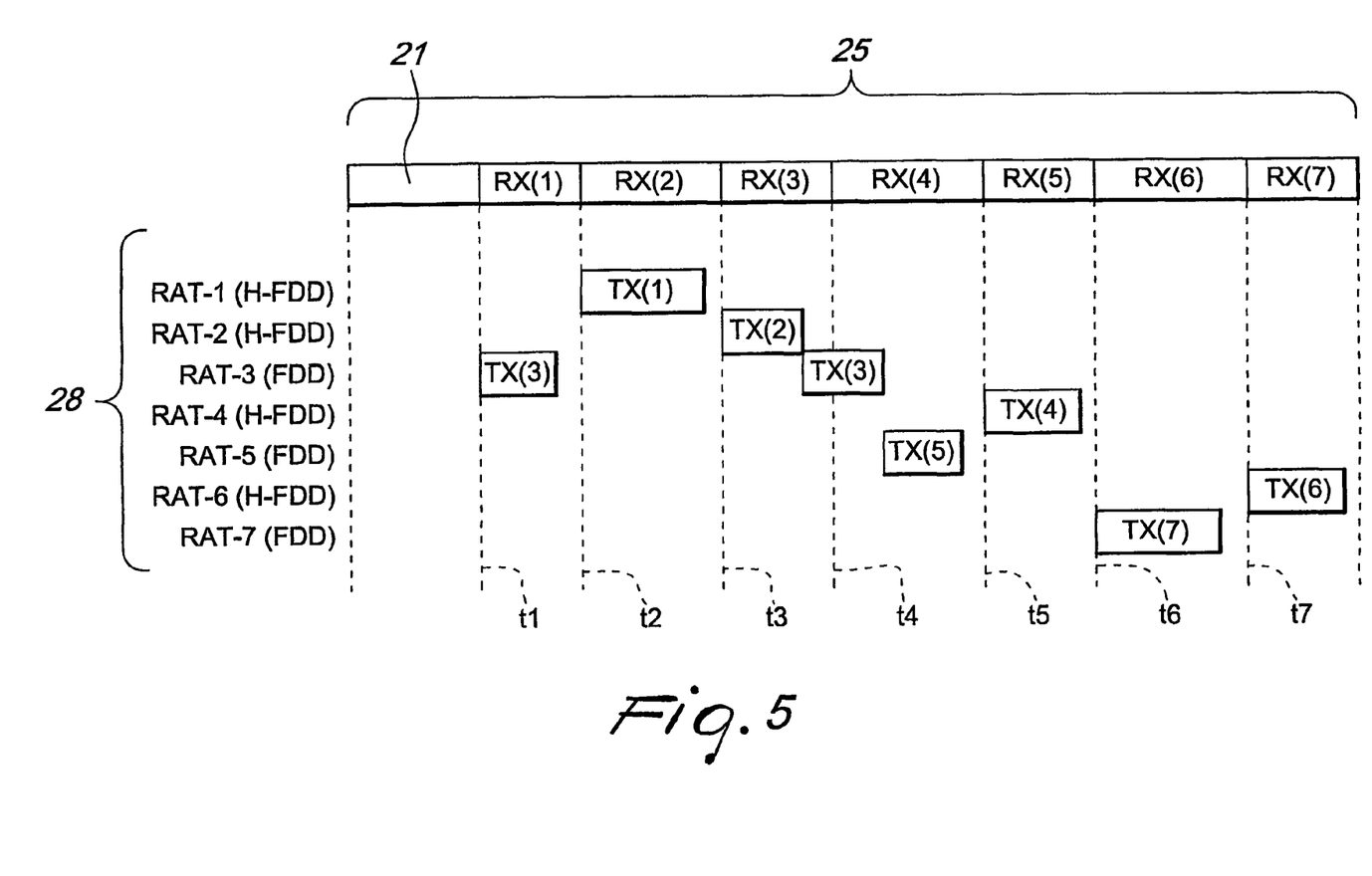
FIG. 5 is a block diagram showing information allocated in a frame including data relating to H-FDD and FDD RATs, according to a second example embodiment.
Figure 6:
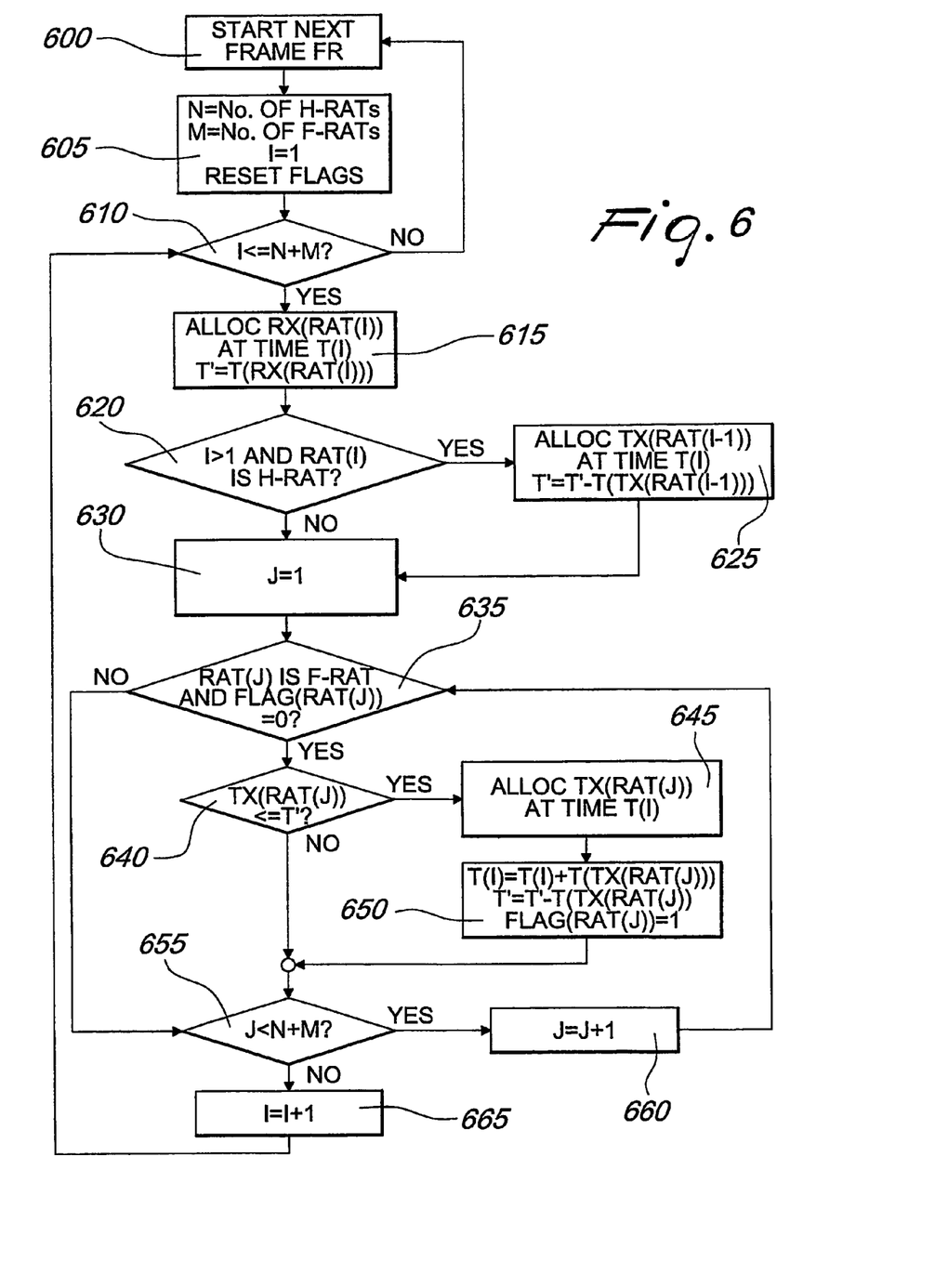
FIG. 6 is a flow diagram showing the steps of a method according to an example embodiment which generates the frame information of FIG. 5.
Figure 7:
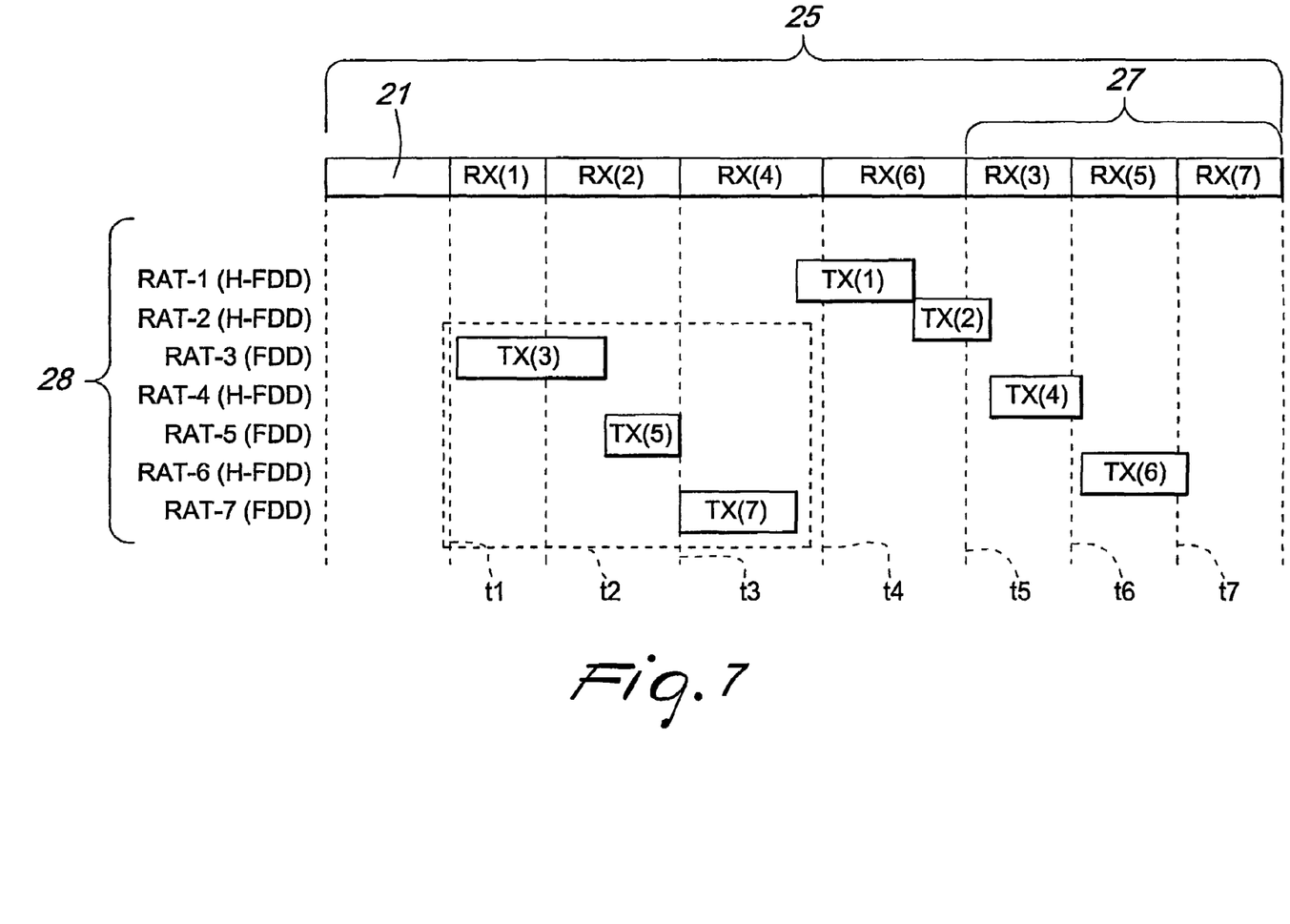
FIG. 7 is a block diagram showing information allocated in a frame including data relating to H-FDD and FDD RATs, according to a third example embodiment.
Figure 8:
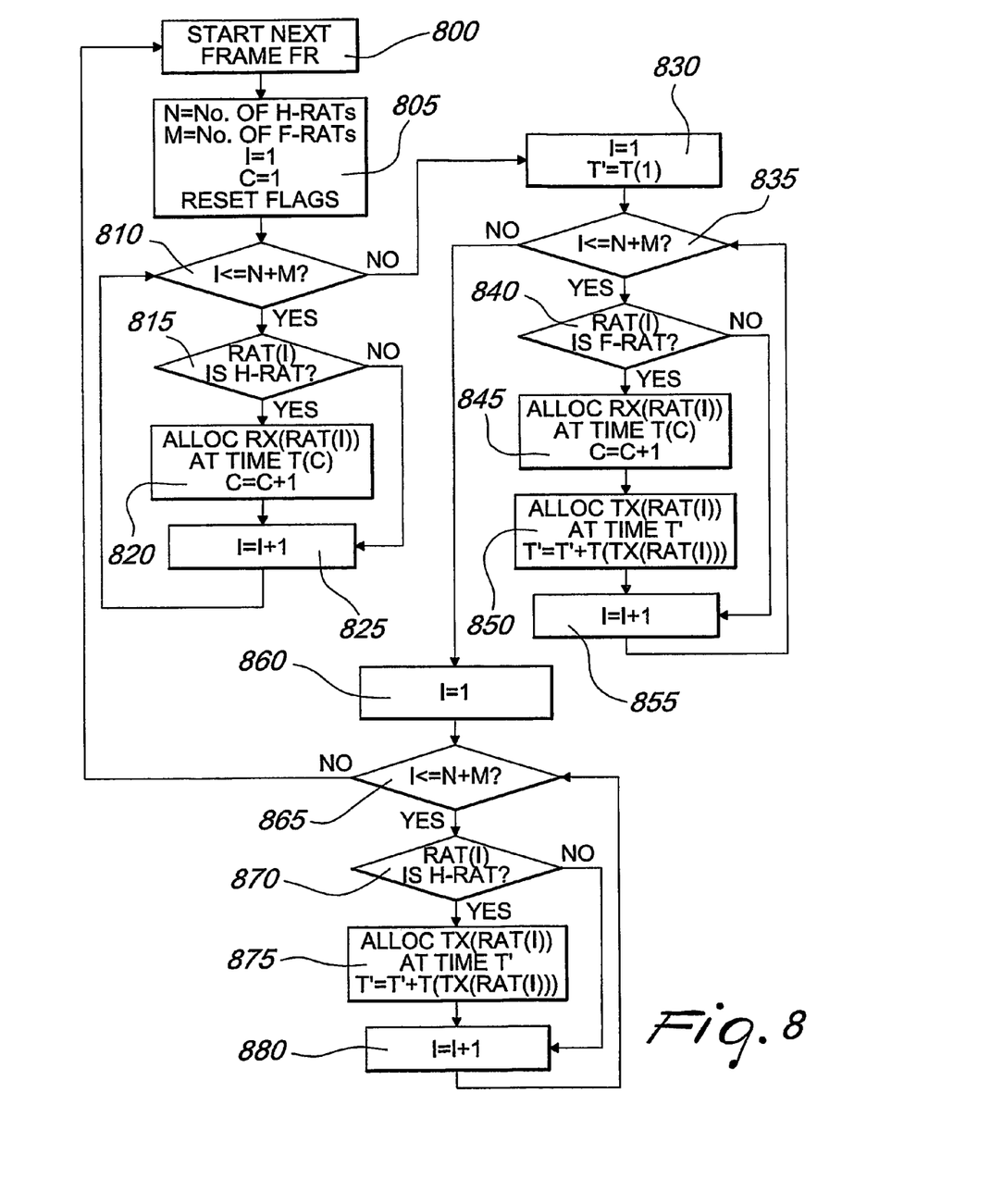
FIG. 8 is a flow diagram showing the steps of a method according to an example embodiment which generates the frame information of FIG. 7.

Two criteria implementing of the disclosed method are illustrated in the data flows of FIG. 6 and FIG. 8, referring to the frame structures of FIGS. 5 and 7 respectively.

With referral to FIG. 6, the scheduler running on radio node station 11 starts handling a new frame 20 at step 600. It is assumed that at least one half duplex RAT and at least one full duplex RAT are in the exemplary list of seven RATs depicted in FIGS. 1 and 5.

At step 605, variable N is set to the amount of half duplex RATs, while variable M is set to the amount of full duplex RATs. Counter I is set to one and each one of seven flags coupled to a corresponding RAT is reset to zero. These flags keep track of which full duplex Tx bursts have already been allocated in the uplink section 28, as it will be better explained below. At step 610, the scheduler checks whether the value of variable I is less or equal to the total amount N+M of RATs in the list. If so, at step 615 an Rx data is allocated in the downlink section of the current frame at time T(I) and a variable T' is set to the amount time actually allocated to the Rx data. At step 620 it is checked whether the RAT is a half-duplex terminal. In this case, and provided that the RAT is not the first in the list, a Tx burst relating to the preceding RAT, i.e. RAT(I−1) is allocated at time T(I) (step 625). At the same time, a new time value T' is computed by subtracting the time required by the just allocated Tx burst to the current value of T'. The remaining T' time can now be used to allocate Tx bursts relating to full duplex terminals. To this purpose, a counter J is set to one at step 630 and a loop is started to fill the T' long frame portion. At step 635 it is checked whether the $j^{th}$ radio access terminal, RAT(J), is a full duplex terminal. Its flag is also checked to see whether its Tx burst has already been allocated in a preceding uplink portion 28 of the current frame.

If RAT(J) is a full duplex terminal and if its flag is still clear then, at step 640, the scheduler checks whether the Tx burst of RAT(J) fits in T'. Of course, the scheduler may also decide to allocate only one portion of a Tx burst in the available time T' and to keep track that a remaining portion of the Tx data is to be allocated in a following Tx burst. This is depicted, by way of example, in FIG. 5 with regard to Tx(3), which indicates the Tx burst of the third RAT in the list. Those skilled in the art can extend the described method so as to split Tx bursts and switch from a "clear/set" flag mechanism as hereby described to a similar discrete mechanism in which the actual remaining time is stored for each RAT, particularly for each full duplex RAT.

Should the time required for a Tx burst of RAT(J) be less or equal to the one available T', then such Tx burst is allocated at current time T(I) at step 645. At step 650 time T(I) is then increased by the time required by the Tx burst of RAT(J), the remaining available time is decreased by the same amount and the flag of RAT(J) is set to one so as to indicate that the RAT has already been dealt with. At step 655 the scheduler checks whether the counter J has covered all the RATs in the list. If not, at step 660 counter J is increased and the inner loop jumps back to step 635. Once all of the RATs have been checked, counter I is increased at step 665 and the main loop jumps back to test 610, until all Tx RATs are allocated in the current frame.

It is noted that, in this case, the scheduler shall take care to put a half duplex RAT at the top of the list of RATs and, most of all, a full duplex RAT at the bottom of the list. So doing, no Tx burst is to be postponed to the following frame, in that the first portion of the uplink section 28, corresponding to the downlink portion 25 allocated to the first RAT, is loaded with the Tx burst of a full duplex RAT, which needs not wait for its Rx data before transmitting, and no Tx burst of a H-FDD RAT is prevented to send a Tx burst in the current frame, which situation occurs only when the last RAT is half duplex RAT which cannot transmit before its Rx data has been received.

An example of the application of the above described flow is given in FIG. 5, which shows a frame 20 comprising a preamble and broadcast section 21, a downlink section 25 in which all Rx data have been allocated in the actual RAT sequence from one to seven, wherein the Rx data of the $I^{th}$ RAT is indicated by Rx(I), and an uplink section 28, displayed on the vertical axis for clarity reasons, which shows how each Tx burst is allocated. As already mentioned, it is supposed for illustrative purposes that RAT number 3 requires an unusually long Tx burst, so that the data to be transmitted to the radio node station 11 is split in two portions, one at time T(1), i.e. the beginning of the frame section, and one at time T3+T(Tx(RAT(2))), i.e. the time at which the H-FDD RAT-3 Rx data is allocated plus the time needed by the Tx burst of RAT-2.

A second criterion is applied with regard to the data flow of FIG. 8, which in turns refers to the block diagram of FIG. 7. In this case, the scheduler scans the whole list of RATs and places the Rx data of the half duplex RATs at the start of the downlink section 25 and the Rx data of the full duplex RATs at the end of the same downlink section, as shown in FIG. 7. On the contrary, in order to optimise Tx burst allocation in the uplink section 28 of the frame and to leave no holes between two adjacent Tx bursts, all of the Tx bursts relating to full duplex terminals are allocated first, in the uplink section 28. As a result, as again shown in FIG. 7, the Rx data of full duplex terminals are grouped in group 27 in the end portion of the downlink section 25, while the corresponding Tx bursts are grouped in group 28 in the start portion of the uplink section 28.

Referring now in more detail to the flow diagram of FIG. 8, at step 800 the scheduler starts handling a new frame. At step 805 variable N is set to the amount of half duplex terminals, variable M is set top the amount of full duplex terminals, a first counter I and a second counter C are both set to one. Finally, as in the previous case, each one of seven flags coupled to a corresponding RAT is reset to zero. These flags keep track of which Tx bursts have already been allocated in the uplink section 28. At step 810, the scheduler checks whether the value of counter I is less than or equal to the total amount N+M of the RATs in the list, i.e. if all RATs have been scanned.

If more RATs are available, it is checked at step 815 whether RAT(I), the $I^{th}$ RAT, is a half duplex RAT. If so, at step 820 the Rx data of RAT(I) is allocated in the downlink section 25 of the frame at time T(C) and the counter C is increased by one unit so as to indicate the next position where an Rx data is to be placed. At step 825 counter I is in turn increased and the loop jumps back to test 810. When all RATs have been scanned for the first time, the first portion of the downlink section 25 has been filled. Referring to FIG. 7, Rx(1), Rx(2), Rx(4) and Rx(6) have been properly allocated in the downlink section of the frame.

A second loop, starting at step 830, scans again the list of RATs in order to allocate both the Rx and Tx bursts of the full duplex terminals. At step 830, counter I is set to 1 to indicate the first RAT in the list, while T', which in this case does not indicate the available amount to fit a Tx burst but the first free available point where a next Tx burst may be allocated, is set to T(1), i.e. to the starting point of the uplink section 28. At step 835, the scheduler checks whether the value of counter I is less than or equal to the total amount N+M of the RATs in the list, i.e. if all RATs have been scanned. If any RAT is left, it is checked at step 840 whether RAT(I), the $I^{th}$ RAT, is a full duplex RAT. If so, at step 845 the Rx data of RAT(I) is allocated in the downlink section 25 of the frame at time T(C) and the counter C is increased by one.

At step 850, the Tx burst of RAT(I) is allocated in the uplink section 28 of the frame at time T' and T' is increased by the amount of time T(Tx(RAT(I))) required by such Tx burst. At step 855 counter I is increased and the loop jumps back to test 835. When all RATs have been scanned for the second time, the downlink section 25 is ready and the first portion of the uplink section 28 has been filled up to T'. Referring to FIG. 7, Tx(3), Tx(5) and Tx(7) have been properly allocated in the uplink section of the frame.

The scheduler is now ready to perform a final loop, starting at step 860 where counter I is set once again to one, to allocate the remaining Tx bursts, i.e. the Tx bursts relating to half duplex RATs. At step 865, the scheduler checks whether the value of counter I is less than or equal to the total amount N+M of the RATs in the list, i.e. if all RATs have been scanned for the third time. If any RAT is left, it is checked at step 870 whether RAT(I), the $I^{th}$ RAT, is a half duplex RAT. If so, at step 875 the Tx burst of RAT(I) is allocated in the uplink section 25 of the frame at time T' and T' is increased by the amount of time T(Tx(RAT(I))) required by such Tx burst. At step 880 counter I is increased and the loop jumps back to test 865. When all RATs have been scanned for the third time, the uplink section 28 is finalised and the scheduler is ready to handle a next frame.

It has thus been shown that the technology above fulfills the proposed aim and objects. Clearly, several modifications will be apparent to and can be readily made by those skilled in the art. The scope of the claims shall not be limited by the illustrations or the preferred embodiments given in the description in the form of examples.

The invention claimed is:

1. A method of scheduling downlink and uplink data in a frame for communication between a radio node station, a plurality of half-duplex radio access terminals, and a plurality of full duplex radio access terminals, comprising the radio node station performing the steps of, in a current frame fr: a) allocating a receive Rx burst in a downlink portion for each $i^{th}$ radio access terminal, where $1 \leq i \leq n+m$ at a time $t_i$, n being a total number of half-duplex radio access terminals, m being a total number of full-duplex radio access terminals, and $t_i$ being a point in the frame marking a start of an Rx data; b) allocating a transmit Tx burst in an uplink portion for each $i^{th}$ radio access terminal, where $1 \leq i \leq n+m$; c) allocating the first Rx data in the downlink portion to a half-duplex radio access terminal; d) allocating the last Rx data in the downlink portion to a full-duplex radio access terminal; e) allocating the Tx burst for each $i^{th}$ half-duplex radio access terminal starting at a time $t_{i+1}$, corresponding to said time $t_i$ increased by the duration of said Rx burst; f) allocating the Tx burst for each $i^{th}$ full-duplex radio access terminal in the first available time interval not allocated to half-duplex radio access terminals or to another full duplex terminal; and g) if the Tx burst for each $i^{th}$ full-duplex radio access terminal does not fit in said first available time interval, allocating only one portion of such Tx burst in said first available time interval and keeping track that a remaining portion of the Tx burst is to be allocated.

2. A method of scheduling downlink and uplink data in a frame for communication between a radio node station, a plurality of half-duplex radio access terminals, and a plurality of full-duplex radio access terminals, comprising the radio node station performing the steps of, in a current frame fr: a) allocating a receive Rx burst in a first downlink portion for each $i^{th}$ half-duplex radio access terminal, where at a time $t_i$, n being a total number of half-duplex radio access terminals and $t_i$ being a point in the frame marking a start of an Rx data; b) allocating an Rx data in a second downlink portion for each $i^{th}$ full duplex radio access terminal, where $1 \leq i \leq m$ at a time $t_{n+i}$, m being the total number of full-duplex radio access terminals, and "$t_n$" being the total time required to allocate all of the Rx bursts directed to half duplex terminals; c) allocating a transmit Tx burst in an uplink portion for each $i^{th}$ radio access terminal, where $1 \leq i \leq n+m$; d) allocating the first Rx data in the downlink portion to a half-duplex radio access terminal; e) allocating the last Rx data in the downlink portion to a full-duplex radio access terminal; f) allocating first the Tx burst for each $i^{th}$ full-duplex radio access terminal in a start portion of the uplink portion; g) then, allocating the Tx burst for each $i^{th}$ half-duplex radio access terminal at the first available time left in the uplink portion not allocated to full duplex terminals.

3. The method of claim 2, wherein the last portion of the uplink frame section allocates a half-duplex radio access terminal requiring no transmission.

4. The method of claim 3, wherein the first portion of the downlink frame section frame allocates a half-duplex radio access terminal requiring no reception.

5. The method of claim 3, wherein the size of the groups is dynamically changed on a frame by frame basis

* * * * *

UNITED STATES PATENT AND TRADEMARK OFFICE
CERTIFICATE OF CORRECTION

PATENT NO. : 7,729,330 B2  Page 1 of 1
APPLICATION NO. : 10/558200
DATED : June 1, 2010
INVENTOR(S) : Nascimbene et al.

It is certified that error appears in the above-identified patent and that said Letters Patent is hereby corrected as shown below:

Title Page, Item (52), under "U.S. Cl.", in Column 1, Line 1, after "370/508;" delete "370/31" therefor.

In Column 5, Line 21, delete "T(1)." and insert -- T(I). --, therefor.

In Column 8, Line 36, in Claim 2, after "where" insert -- $1 \leq i \leq n$ --.

Signed and Sealed this
Seventeenth Day of May, 2011

David J. Kappos
*Director of the United States Patent and Trademark Office*